(12) United States Patent
DeLillo

(10) Patent No.: US 7,964,011 B2
(45) Date of Patent: Jun. 21, 2011

(54) MULTI-THROAT AIR FILTER

(75) Inventor: Michael J. DeLillo, Pacific Palisades, CA (US)

(73) Assignee: Walker Design, Inc., Sun Valley, CA (US)

( * ) Notice: Subject to any disclaimer, the term of this patent is extended or adjusted under 35 U.S.C. 154(b) by 337 days.

(21) Appl. No.: 12/180,513

(22) Filed: Jul. 25, 2008

(65) Prior Publication Data

US 2009/0025347 A1 Jan. 29, 2009

(51) Int. Cl.
*B01D 46/00* (2006.01)
(52) U.S. Cl. ............ 55/505; 55/498; 55/502; 55/507; 55/510
(58) Field of Classification Search .......... 55/498, 55/510, 505, 507, 502; 210/493.2, 497.01
See application file for complete search history.

(56) References Cited

U.S. PATENT DOCUMENTS

| | | | | |
|---|---|---|---|---|
| 5,112,372 | A | * | 5/1992 | Boeckermann et al. ......... 96/388 |
| 5,458,666 | A | * | 10/1995 | Miyakata ......................... 55/327 |
| 5,919,279 | A | * | 7/1999 | Merritt et al. ................. 55/385.3 |
| 7,115,156 | B2 | * | 10/2006 | Schaerlund et al. ............. 95/268 |
| 2002/0053193 | A1 | * | 5/2002 | Sugano ............................ 55/498 |
| 2004/0244586 | A1 | * | 12/2004 | Schaerlund et al. ............. 95/268 |
| 2009/0019823 | A1 | * | 1/2009 | Juliar et al. ...................... 55/472 |
| 2009/0163131 | A1 | * | 6/2009 | Walkinshaw et al. ........... 454/76 |

* cited by examiner

*Primary Examiner* — Robert A Clemente
(74) *Attorney, Agent, or Firm* — Christie, Parker & Hale, LLP

(57) ABSTRACT

An air filter is provided having a filter body and a throat connected to a bottom of the filter body. The throat includes a plurality of throat sections. Each of the plurality of throat sections has a different inner diameter. The throat may further included molded trim guides for facilitating trimming of the throat at throat section interfaces.

7 Claims, 3 Drawing Sheets

MULTI-THROAT AIR FILTER

BACKGROUND OF THE INVENTION

1. Field of the Invention

The present invention relates generally to an air filter, and more particularly, to a multi-throat air filter.

2. Description of Related Art

Air filters are generally known in the art. FIG. 1 is a perspective view of a conventional air filter 10. The conventional air filter 10 has a body 11 with a filter element 12 and a throat 13 for fitting around an intake line. The throat 13 is tightened to the intake line by clamp 14.

In conventional air filters, the throat 13 has one diameter for fitting a narrow range of intake line diameters. Consumers must therefore purchase the correct model of the conventional air filter 10 for use with a particular sized intake line. Purchasing the correct model of air filter may be confusing for consumers. Furthermore, supplying various models of air filters with various throat diameters may be more costly than necessary for manufacturers.

Therefore, a need exists for an air filter that may be used with a greater range of intake line diameters. Such an air filter would be more convenient for consumers and less costly for manufacturers.

SUMMARY OF THE INVENTION

An air filter having a filter body and throat is provided. The filter body has a cylindrical shape. The throat is connected to the filter body. The throat has a cylindrical shape. The throat includes a plurality of throat sections. Each of the plurality of throat sections has a different inner diameter. The plurality of throat sections are arranged in order of diameter size.

In an exemplary embodiment of the present invention, the air filter further includes a molded trim guide located on an outer surface of the throat at intervals corresponding to the locations of interfaces of the plurality of throat sections for facilitating trimming of the plurality of throat sections.

In an exemplary embodiment of the present invention, the plurality of throat sections include throat sections having inner diameters of 1.50 inches, 1.75 inches, and 2.00 inches.

In an exemplary embodiment of the present invention, each of the plurality of throat sections has a width of approximately 0.50 inches.

In an exemplary embodiment of the present invention, the filter body is washable or cleanable.

In an exemplary embodiment of the present invention, the plurality of throat sections are arranged with the throat section of the largest diameter positioned closest to the filter body and the throat section of the smallest diameter positioned farthest from the filter body.

In an exemplary embodiment of the present invention, the plurality of throat sections are arranged with the throat section of the smallest diameter positioned closest to the filter body and the throat section of the largest diameter positioned farthest from the filter body.

In an exemplary embodiment of the present invention, the air filter further includes a clamp adapted to tighten around one of the plurality of throat sections.

DETAILED DESCRIPTION

Figure 1:
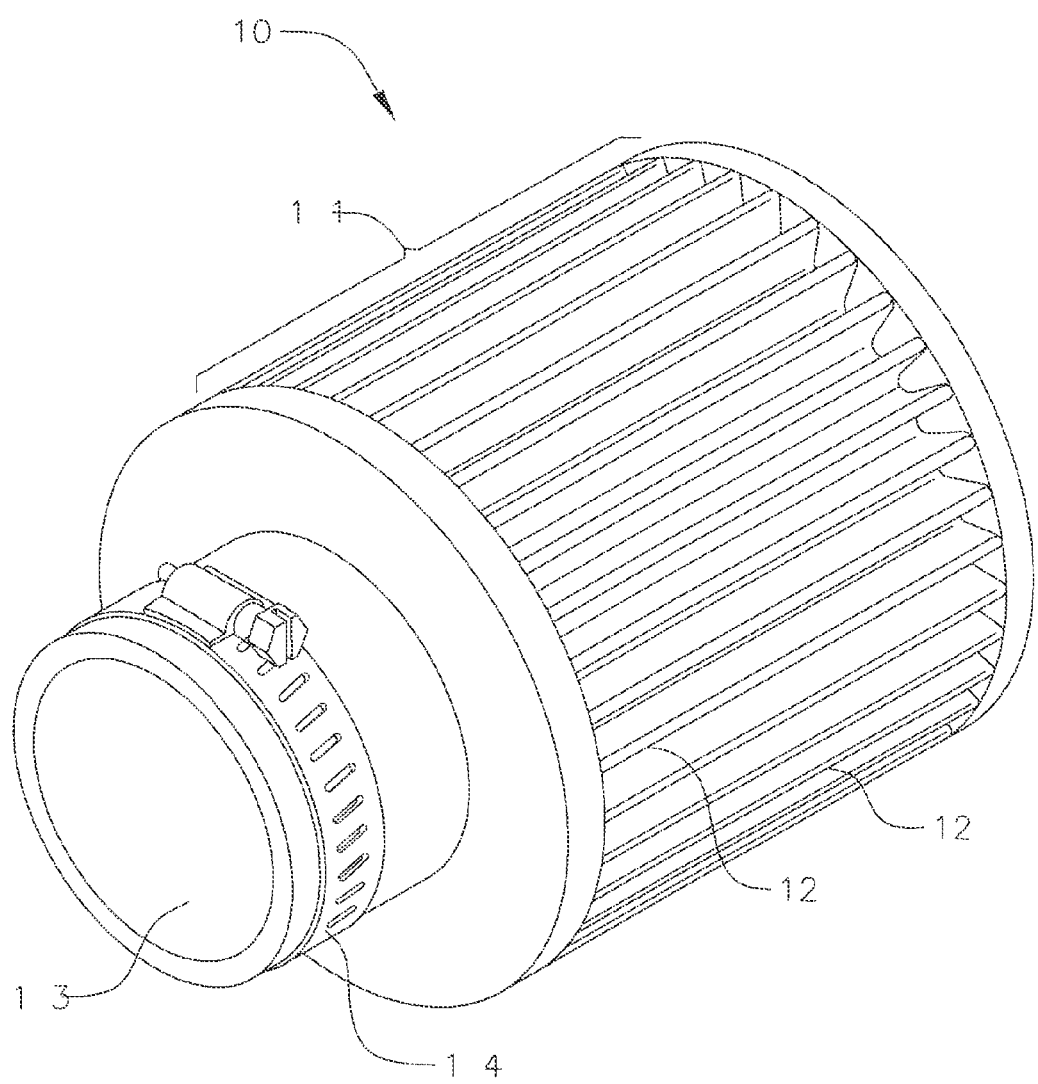
FIG. 1 is a perspective view of a conventional air filter.
Figure 2:
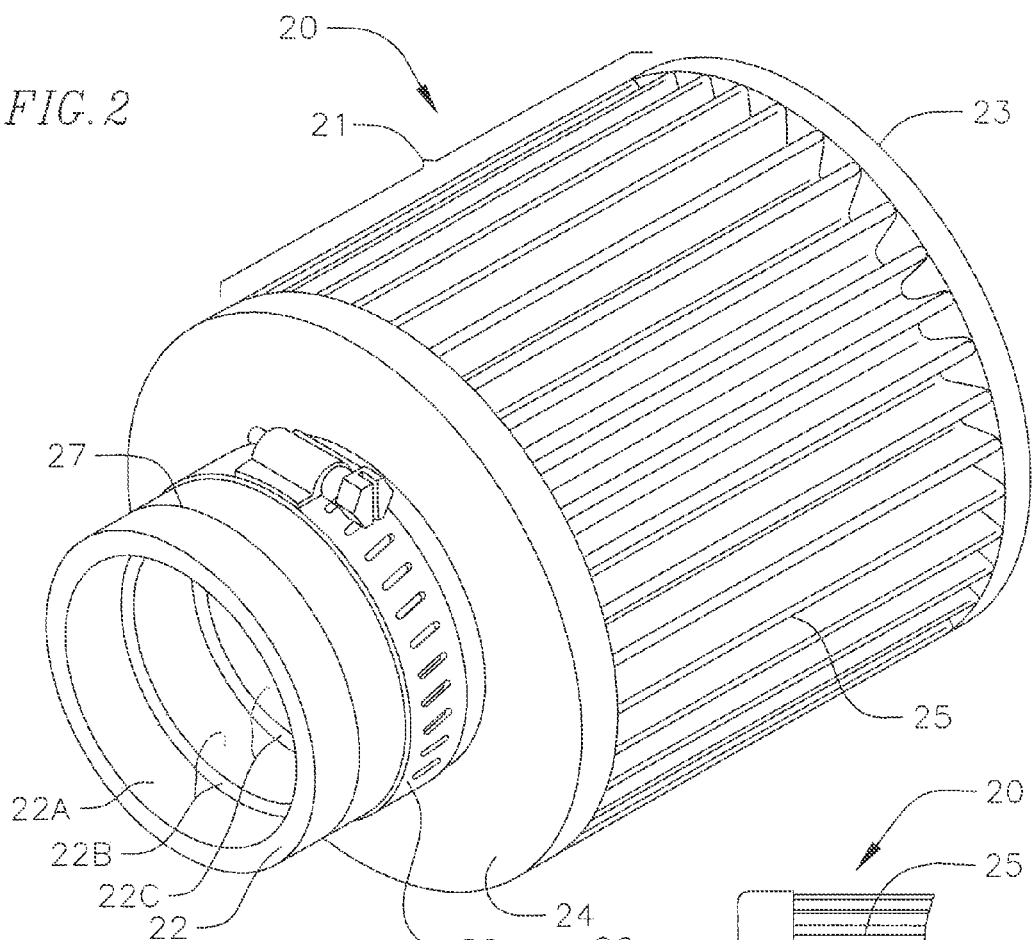
FIG. 2 is a perspective view of a multi-throat air filter according to an exemplary embodiment of the present invention.

FIG. 2 is a perspective view of a multi-throat air filter 20 according to an exemplary embodiment of the present invention. The multi-throat air filter 20 has a filter body 21 and a throat 22. The filter body 21 has a filter body top 23 and filter body bottom 24 formed of plastic, rubber, or like material, with a filter element 25 extending between and held in place by the filter body top 23 and filter body bottom 24. The filter element 25 is washable and cleanable. The throat 22 is connected to and formed with the filter body bottom 24. The throat 22 includes a plurality of throat sections 22A, 22B, 22C having varying diameters. That is, the throat 22 is formed in the shape of a cylinder, with throat sections 22A, 22B, 22C having increasing wall thicknesses as the throat 22 nears the filter body bottom 24. The wall thicknesses of the throat sections 22A, 22B, 22C increase in a step-like manner, thus providing discrete reductions in diameter of the throat 22.

Although the throat 22 is depicted with three throat sections in FIG. 2, exemplary embodiments may have two or more throat sections with various throat sections widths. A clamp 26 is selectively positionable around each throat section, thus the throat section width is approximately equal to the width of the clamp 26.

The throat 22 may further include molded trim guides 27 for facilitating trimming of the throat 22. The molded trim guides 27 are formed around the outer surface of the throat 22 at intervals corresponding to the locations of interfaces between each of the throat sections 22A, 22B, 22C. Thus, a consumer may use the molded trim guides to trim off throat sections with a larger diameter than required for a particular intake line.

Figure 3:
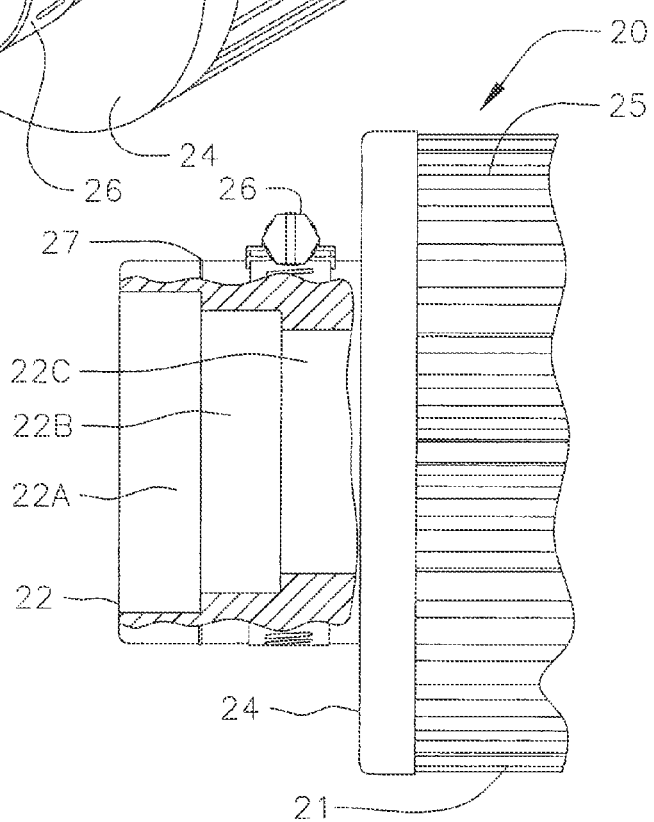
FIG. 3 is a sectional side view of a throat of the multi-throat air filter according to an exemplary embodiment of the present invention.

FIG. 3 is a side view of the throat 22 of the multi-throat air filter 20 according to an exemplary embodiment of the present invention. As depicted in FIG. 3, the throat 22 has three throat sections. In an exemplary embodiment, the throat 22 includes three diameters with throat sections 22A, 22B, and 22C having an inner diameter of 2.00 inches, 1.75 inches, and 1.50 inches, respectively, with each of the throat sections 22A, 22B, 22C having a width of about 0.50 inches.

Figure 4:
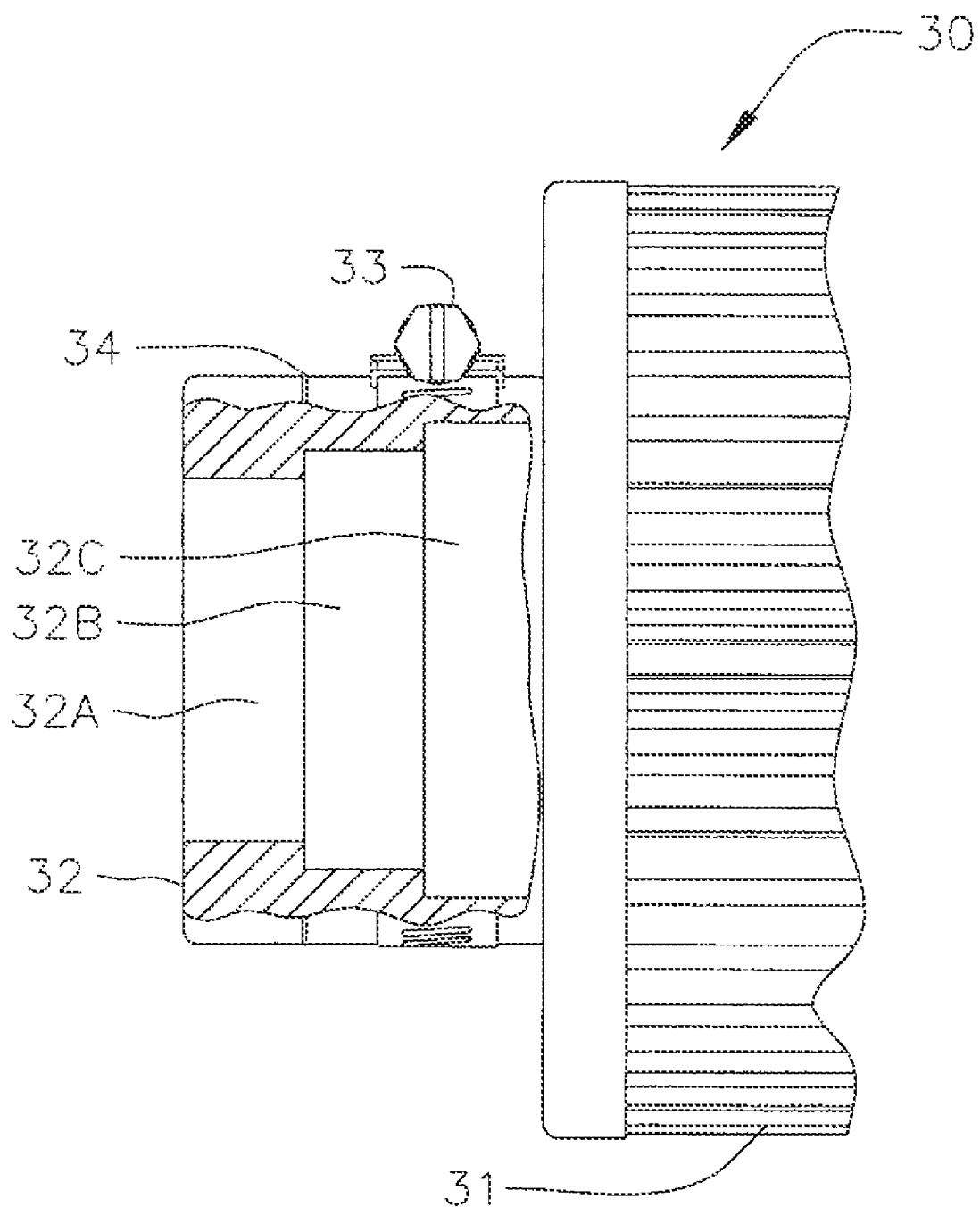
FIG. 4 is a sectional side view of a throat of a multi-throat air filter according to another exemplary embodiment of the present invention.

FIG. 4 is a side view of a throat 32 of a multi-throat air filter 30 according to another exemplary embodiment of the present invention. The multi-throat air filter 30 includes a filter body 31 with throat 32. Unlike throat 22, the throat 32 is formed with an increasing diameter as the throat 32 nears the bottom of the filter body 31. Forming the throat 32 with an increasing inner diameter will avoid any limitation in air flow through the throat 32 given a particular diameter intake line.

For example, assume an intake line has a diameter of 1.75 inches; throat 22 has throat sections 22A, 22B, 22C with diameters of 2.00 inches, 1.75 inches, and 1.50 inches, respectively; and throat 32 has throat sections 32A, 32B, 32C with diameters of 1.50 inches, 1.75 inches, and 2.00 inches, respectively. A consumer must therefore trim sections 22A, 32A to reveal sections 22B, 32B, respectively, for attachment to the intake line. Trimming throat section 22A will result in throat 22 having a smallest diameter of 1.50 inches (i.e., 22B is 1.75 inches and 22C is 1.50 inches, therefore the smallest inner diameter of the throat 22 is 1.50 inches). However, trimming throat section 32A will result in throat 32 having a smallest diameter of 1.75 inches (i.e., 22B is 1.75 inches and 22C is 2.00 inches, therefore the smallest inner diameter of the throat 32 is 1.75 inches).

As depicted in FIG. 4, the throat 32 has three throat sections. In an exemplary embodiment, the throat 32 includes three diameters with throat sections 32A, 32B, and 32C having an inner diameter of 1.50 inches, 1.75 inches, and 2.00 inches, respectively, with each of the throat sections 32A, 32B, 32C having a width of about 0.50 inches.

Although the throat 32 is depicted with three throat sections in FIG. 4, exemplary embodiments may have two or more throat sections with various throat section widths. A clamp 33 may be selectively positioned around each throat section, thus the throat section width is approximately equal to the width of the clamp 33.

The throat 32 may further include molded trim guides 34 for facilitating trimming of the throat 32. The molded trim guides 34 are formed around the outer surface of the throat 32 at interfaces between each of the throat sections 32A, 32B, 32C. Thus, a consumer may use the molded trim guides to trim off throat sections with a smaller diameter than required for a particular intake line.

In another exemplary embodiment, the multi-throat air filter 20 may include a sound attenuation feature or silencing function.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. An air intake filter for internal combustion engines to facilitate connection to a plurality of air intake lines of different diameters comprising:
   a filter body;
   a trimmable throat connected to the filter body located on the inlet side of the air filter;
   a plurality of stepped sections located in the interior of the throat, each section having a specific uniform and different diameter throughout its width relative to the diameter of an adjacent stepped section;
   a plurality of molded trim guides formed on the outer surface of the throat located at intervals to register with the location of each step on the interior of the throat;
   whereby the connection of the filter to an air intake line for a plurality of air intake line diameters is facilitated by trimming the throat such that the inner throat diameter mates with the outer diameter of the air intake line.

2. The air filter as claimed in claim 1, wherein the plurality of throat sections include throat sections having inner diameters of 1.50 inches, 1.75 inches, and 2.00 inches.

3. The air filter as claimed in claim 1, wherein each of the plurality of throat sections has a width of approximately 0.50 inches.

4. The air filter as claimed in claim 1, wherein the filter body is washable or cleanable.

5. The air filter as claimed in claim 1, wherein the throat section having the smallest diameter is located closest to the filter body and the throat section having the largest diameter is located farthest from the filter body.

6. The air filter as claimed in claim 1, wherein the throat section having the largest diameter is located closest to the filter body and the throat section having the smallest diameter is located farthest from the filter body.

7. The air filter as claimed in claim 1, further comprising:
   a clamp adapted to tighten around one of the plurality of throat sections.

\* \* \* \* \*